(12) United States Patent
Johnson, Jr.

(10) Patent No.: US 6,382,656 B1
(45) Date of Patent: May 7, 2002

(54) ANTI-RATTLE DEVICE FOR A TRAILER HITCH

(76) Inventor: Howard Percival Johnson, Jr., 15200 Mt. Calvert Rd., Upper Marlboro, MD (US) 20772-9619

( * ) Notice: Subject to any disclaimer, the term of this patent is extended or adjusted under 35 U.S.C. 154(b) by 0 days.

(21) Appl. No.: 09/633,813

(22) Filed: Aug. 7, 2000

(51) Int. Cl.⁷ .................................................. B60D 1/58
(52) U.S. Cl. ...................................................... 280/506
(58) Field of Search .............................. 280/506, 491.5, 280/491.1, 495, 504, 507, 511

(56) References Cited

U.S. PATENT DOCUMENTS

| | | | |
|---|---|---|---|
| 3,679,234 A | * 7/1972 | Colliau ........................ | 280/511 |
| 3,968,981 A | * 7/1976 | Suarez ........................ | 280/511 |
| 3,990,722 A | 11/1976 | Casad et al. | |
| 4,060,331 A | * 11/1977 | Domer et al. ............... | 403/130 |
| 4,305,676 A | * 12/1981 | Wallbank ..................... | 403/130 |
| 5,333,888 A | 8/1994 | Ball | |
| 5,344,175 A | 9/1994 | Speer | |
| 5,593,172 A | 1/1997 | Breslin | |
| 5,722,300 A | * 3/1998 | Burkhard et al. .............. | 74/493 |
| 5,853,838 A | * 12/1998 | Siems et al. ................... | 428/43 |
| 5,953,862 A | * 9/1999 | Earhart et al. .................. | 52/98 |
| 5,988,667 A | 11/1999 | Young | |

* cited by examiner

Primary Examiner—Kevin Hurley
(74) Attorney, Agent, or Firm—Stevens, Davis, Miller & Mosher, L.L.P.

(57) ABSTRACT

An anti-rattle device for a trailer hitch for eliminating the need for lubrication and reducing annoying noise, vibration and damaging wear between (1) the shaft of a hitch mount and the tubular receiver in which the mount is removably secured by a cross pin includes one or more flexible shim members slideably inserted between the shaft and the receiver and (2) the ball mount and the ball mount receiver includes a multilayer flexible pad inserted between the ball mount and the ball mount receiver.

16 Claims, 6 Drawing Sheets

ANTI-RATTLE DEVICE FOR A TRAILER HITCH

FIELD OF THE INVENTION

The present invention relates to trailer hitches and in particular to a sacrificial anti-rattle device to eliminate the need for a lubricant and to avoid annoying noise and damaging wear caused by the movement and vibration associated with permanent and removable trailer hitches and their housings.

BACKGROUND OF THE INVENTION

Ball type hitches are a common means for providing a connection between a trailer and a towing vehicle. Such hitches are typically detachable from the towing vehicle but in some instances are permanently affixed to the towing vehicle. A detachable hitch is commonly attached to the towing vehicle by means of a rigid rectangular sleeve which is mounted at the rear of the vehicle. A rectangular shaft of the hitch, called the draw bar, that is slightly smaller than the sleeve is slid into the sleeve. A pin or bolt is then inserted through matching holes in the side walls of the sleeve and shaft draw bar, and then fastened to prevent the pin or bolt from slipping out of the holes. Receiver-type hitches are also employed with carriers used for transporting bicycles, jet skis, motorcycles and other devices and goods.

Detachable hitches are often utilized due to the fact that they address problems associated with safety and aesthetics. Hitches need to extend beyond the rear of the towing vehicle to enable attachment of the trailer to the hitch, and to permit the trailer to pivot freely relative to the towing vehicle. The protruding hitch with its ball attachment, however, can be bothersome and dangerous when the vehicle is used without the trailer attached.

Some space is desirable between the walls of the sleeve and the walls of the shaft to allow easy attachment and detachment of the hitch. For the same reason, space is usually left between the ball and the ball receiver housing. These spaces permit ease of coupling and decoupling between the sleeve and the walls of the shaft. In similar fashion, space between the ball and the ball coupler or tongue housing facilitates ease of coupling and decoupling between the ball and ball coupler or tongue housing despite imperfections in the machining of those elements and despite rust and other surface accumulations.

The problem with these spaces is that they allow play in the connection between the hitch and the sleeve and also the ball and the ball receiver housing that can be noisy, annoying and dangerous. The play between the walls of the hitch and sleeve can cause clanging noises and vibrations that can be felt by operators and passengers within the towing vehicle. That play may also be magnified by the lever arm of the hitch so that it is felt more strongly by the trailer and its passengers. That same play can also increase wear and stress on various parts of the mechanisms attaching the trailer to the towing vehicle, leading to undesirable wear and fatigue.

SUMMARY OF THE INVENTION

It would be very advantageous if a means could be provided that eliminates the free play movement and direct physical contact between a ball mount shaft or draw bar and hitch receiver and the free play movement and direct physical contact between the ball mount and the ball mount coupler. The instant invention provides such a device.

It is therefore a primary object of the invention to reduce undesirable direct physical contact between the shaft of a removable mount and the receiver of a receiver-type trailer hitch to eliminate annoying noise, vibration and damage to the hitch components.

It is a further object of the invention to reduce undesirable direct physical contact between the ball of a ball mount hitch or draw bar and the ball mount receiver trailer hitch to eliminate annoying noise, vibration and wear of the hitch components.

It is yet another object to accomplish the foregoing with a device that can be used on existing hitches without requiring modification of either the mount or receiver.

It is yet a still further object to achieve all of the foregoing by providing a device that is inexpensive and easy to install.

These and other objects and advantages are achieved by the invention as will be apparent from the following description, drawing and claims.

DETAILED DESCRIPTION OF THE INVENTION

Figure 1B:
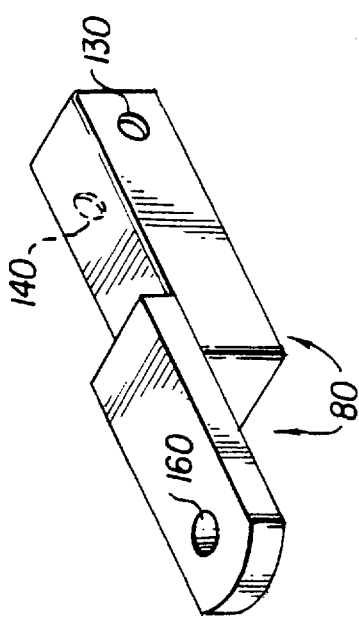
FIG. 1b is a draw bar illustrating an aperture for attachment of a conventional trailer ball.
Figure 1A:
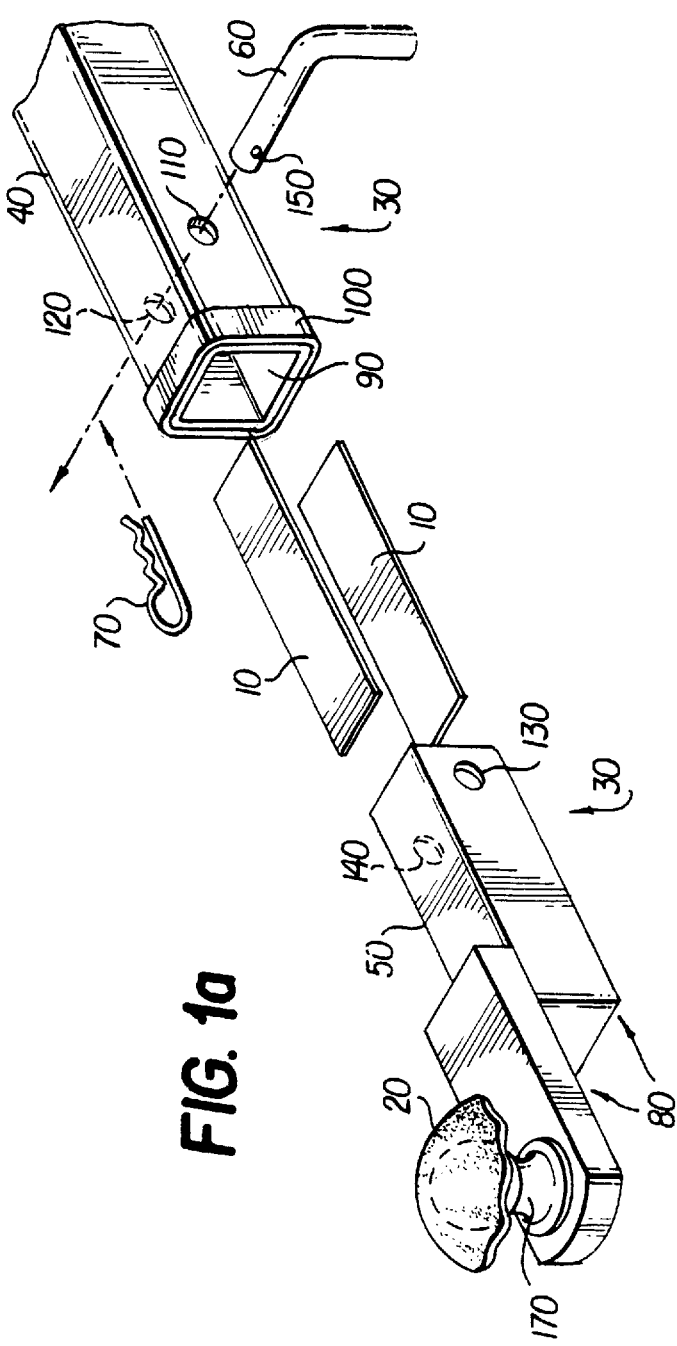
FIG. 1a is a partial exploded perspective of a hitch receiver and a draw bar to be inserted therein, and a ball mount, along with the anti-rattle device of the present invention.
Figure 2A:
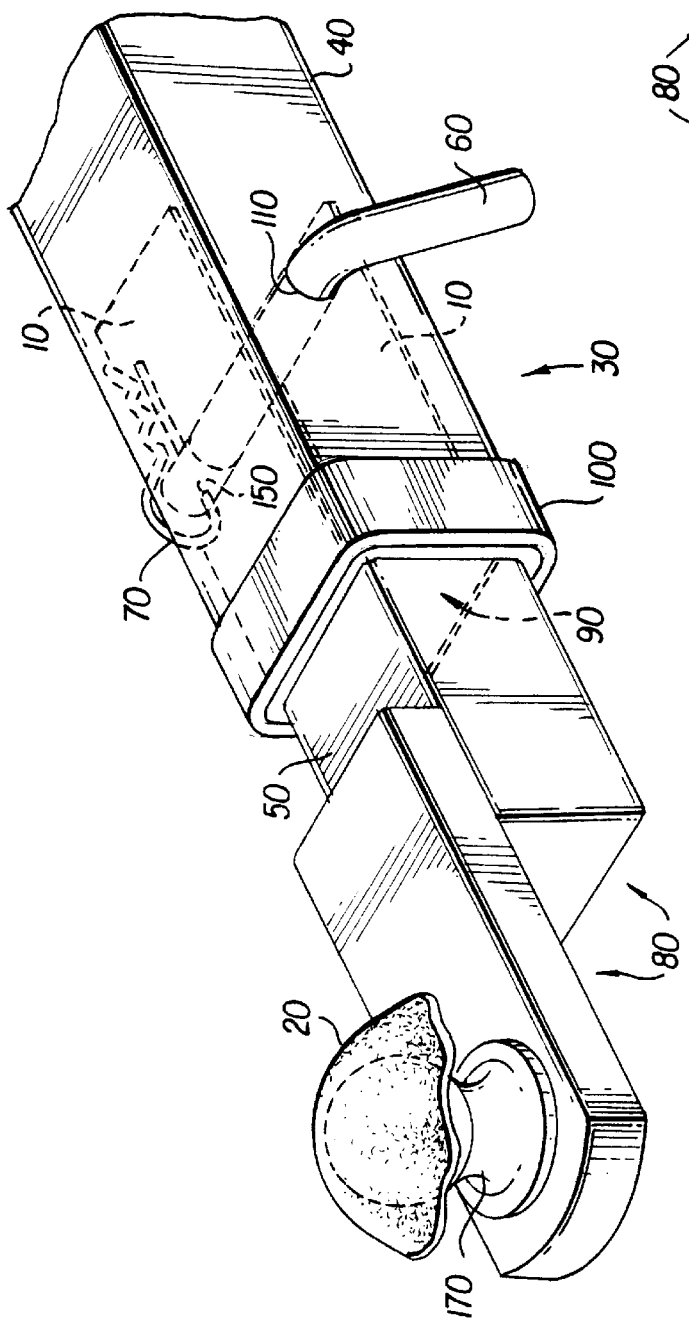
FIG. 2a is a partial perspective of the coupled hitch receiver and draw bar, and ball mount with the anti-rattle device of the present invention installed.
Figure 2B:
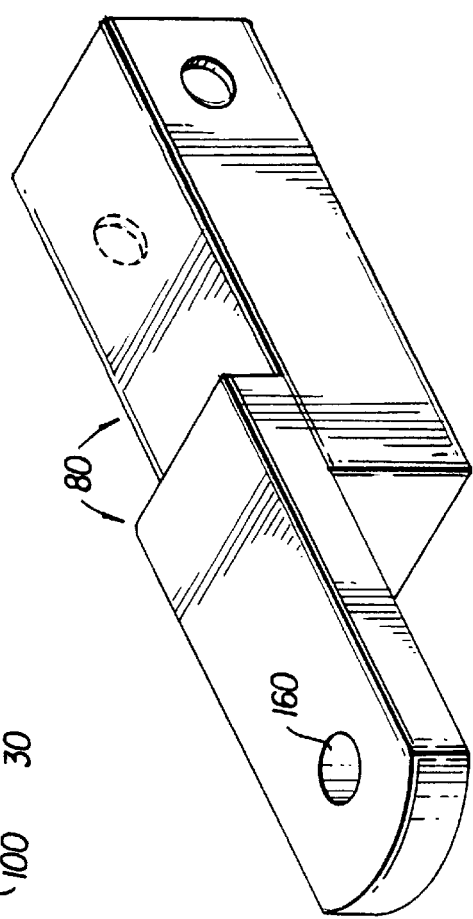
FIG. 2b is a draw bar illustrating an aperture for attachment of a conventional trailer bar.
Figure 3:
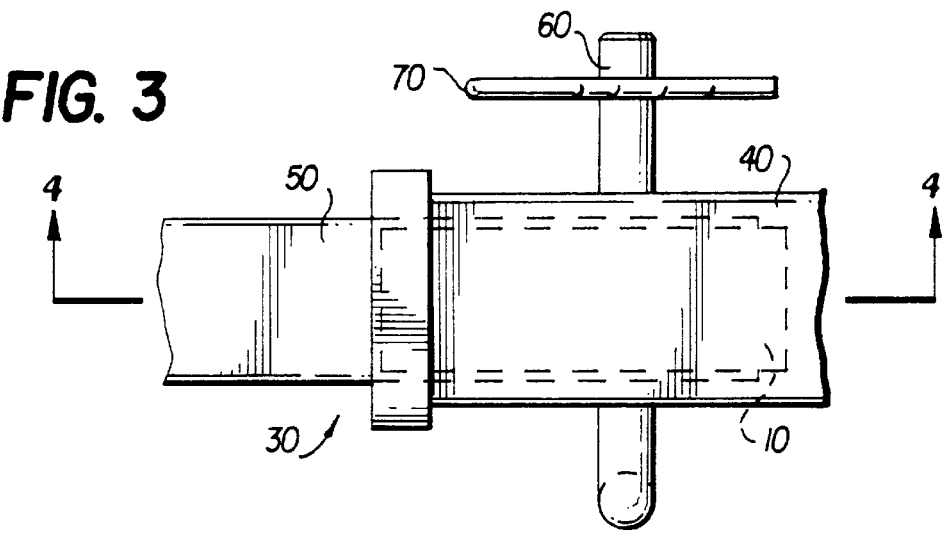
FIG. 3 is a partial top plan view of the assembled draw bar, receiver and two opposing shims of the anti-rattle device of the present invention.
Figure 4:
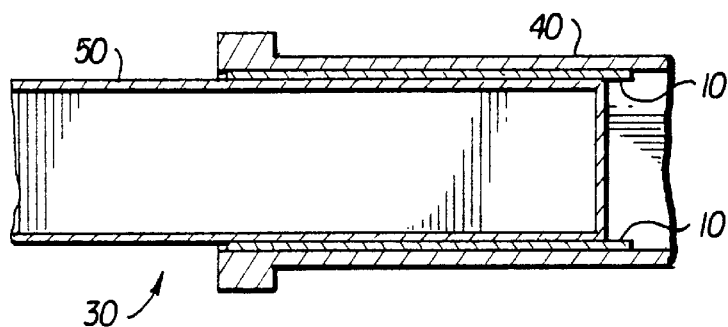
FIG. 4 is a cross-section along line 4—4 of FIG. 3.

Referring to FIGS. 1–6, the anti-rattle device 10, 20 of the preferred embodiment of the present invention includes one or more rectangular shaped shim members 10 formed from sheets of a plastic material, preferably high density polycarbonate plastic, and a circularly shaped multilayered flexible pad 20 also formed from two or more pairs of sheets of a polyethylene plastic material, preferably high density polyethylene plastic, which in the preferred embodiment the sheets have an approximate thickness of 0.013 inches and the pad has a circumference of 6 inches. Sheets of smaller thickness can be used in contact with one another to fill the gap between the inner walls of the receiver 40 and the outside of the draw bar 50.

The shim members 10 are installed on a conventional receiver-type hitch generally referenced at 30 which includes a tubular hitch receiver 40, a draw bar 50 slidably insertable into the hitch receiver 40, a crosspin or locking pin 60, and a retaining clip 70. The mount 80 is provided with a shaft 50 typically of square cross-sectional configuration and slidably insertable into the hollow interior 90 of receiver 40 through open end 100. The hollow interior 90 is complementary in configuration to the shape of the exterior of shaft 50 and sized to provide clearance about all sides of shaft 50 to facilitate insertion into and withdrawal of the removable mount 80 into open end 100 with play necessarily created in all directions.

The crosspin 60 is inserted through apertures 110, 120 provided on opposite sides of receiver 40 and corresponding aligned apertures 130, 140 in the shaft 50 of mount 80. The retaining clip 70 is inserted through aperture 150 at one end of crosspin 60 to secure it in place. Apertures 110, 120 and 130, 140 are slightly larger in diameter than that of crosspin 60 to facilitate insertion and withdrawal of the crosspin 60 thereby necessarily creating clearance or play in the fore and aft directions.

Figure 8A:
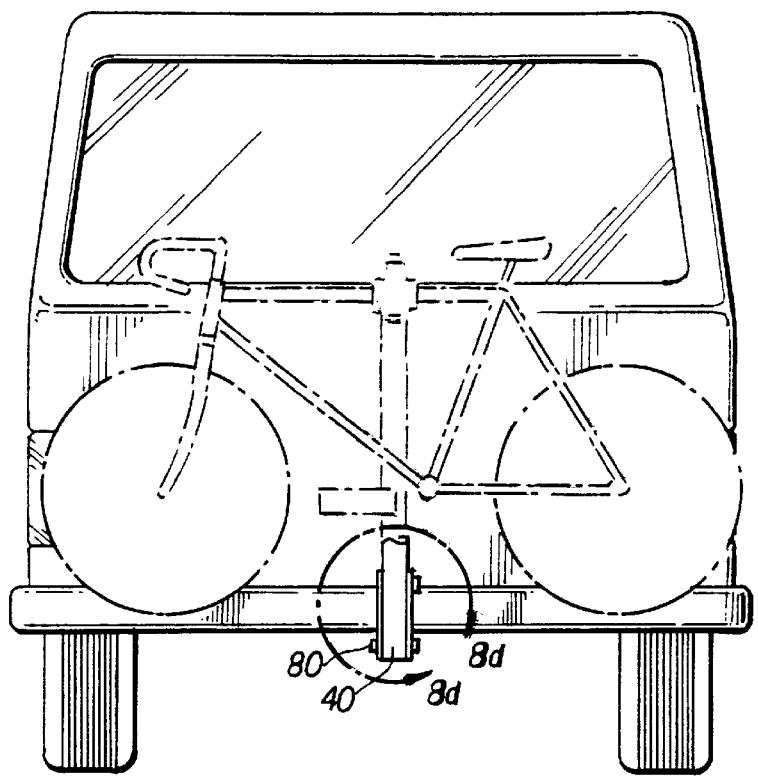
FIGS. 8a–c illustrate the hitch mountable carry device as a bicycle carrier, ski carrier and workbench, respectively.
Figure 8B:
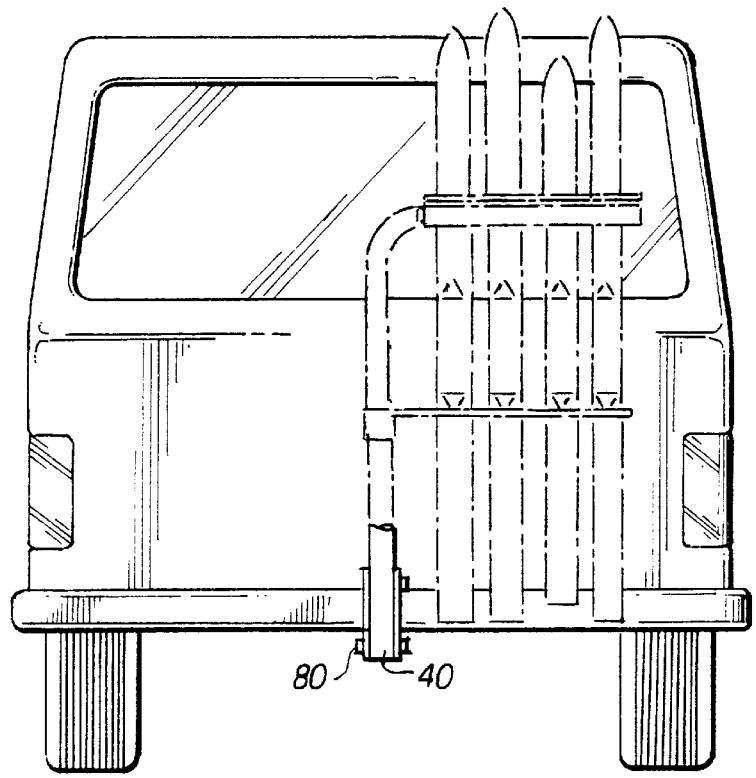
Figure 8C:
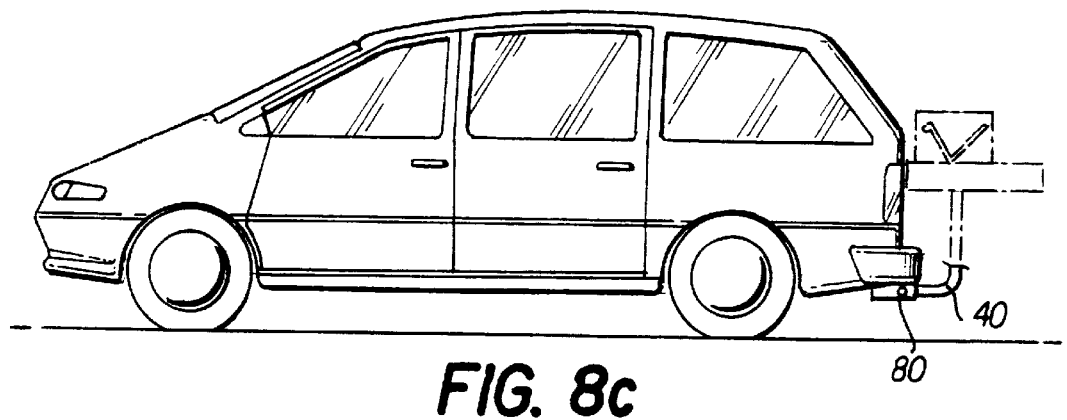
Figure 8D:
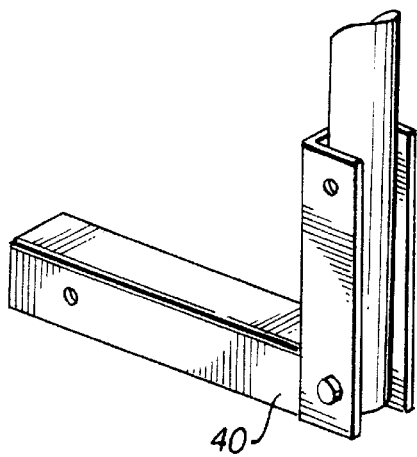
FIG. 8d is an enlarged view of the trailer hitch shown in FIGS. 8a–8c.

Ball mount 80 includes an aperture 160 for attachment of a conventional trailer ball 170. While the preferred embodiment of the instant invention is described in reference to a ball mount 80, as illustrated in FIGS. 8a–c, it can be used without adaptation or modification in conjunction with any of a variety of mounts insertable and removable into and from a receiver 40, such as hitch mountable bicycle carriers 81, ski carriers 82, other article carriers such as utility shelf carriers, workbenches 83 and other devices mountable to a receiver 40 of a receiver-type trailer hitch.

Figure 5:
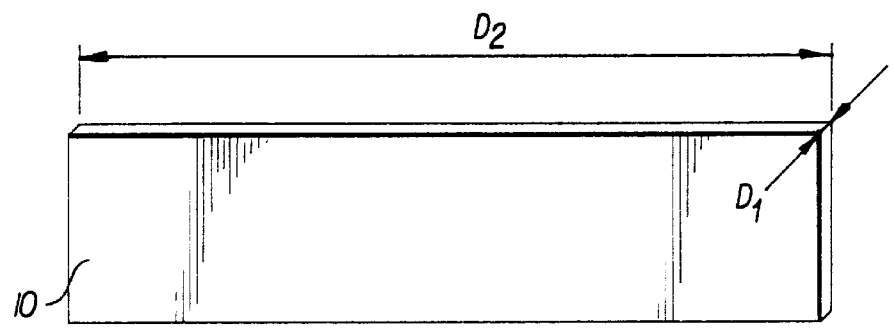
FIG. 5 is a front elevation of the shim of the anti-rattle device of the present invention.

Referring to FIG. 5, the shim members 10 are thin and narrow, preferably with a thickness dimension $D_1$ of 0.013 inches, and a side dimension $D_2$ slightly smaller than that of square shaft 50 to permit slidable placement between the square shaft 50 and the hollow shaft receiver 40. In the preferred embodiment the shims are 2×4×0.013 inches in dimension. The shim members 10 must also have sufficient strength and elasticity to flex without cracking upon being subjected to compressive, bending and twisting forces transmitted by the square shaft and hollow shaft receiver. The hitch is only subject to up and down rattling motions since the pin naturally supports the hitch and prevents side to side motion. In instances where the placement of one shim member is not sufficient to eliminate undesirable movement and vibration, two or more shim members may be placed between the square shaft 50 and the hollow shaft receiver 40 in a layered fashion or on opposite sides of the square shaft and the hollow shaft receiver.

Figure 6:
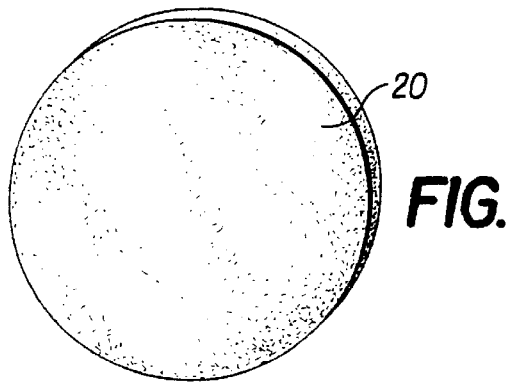
FIG. 6 is a front elevation of the pad of the present invention.
Figure 7:
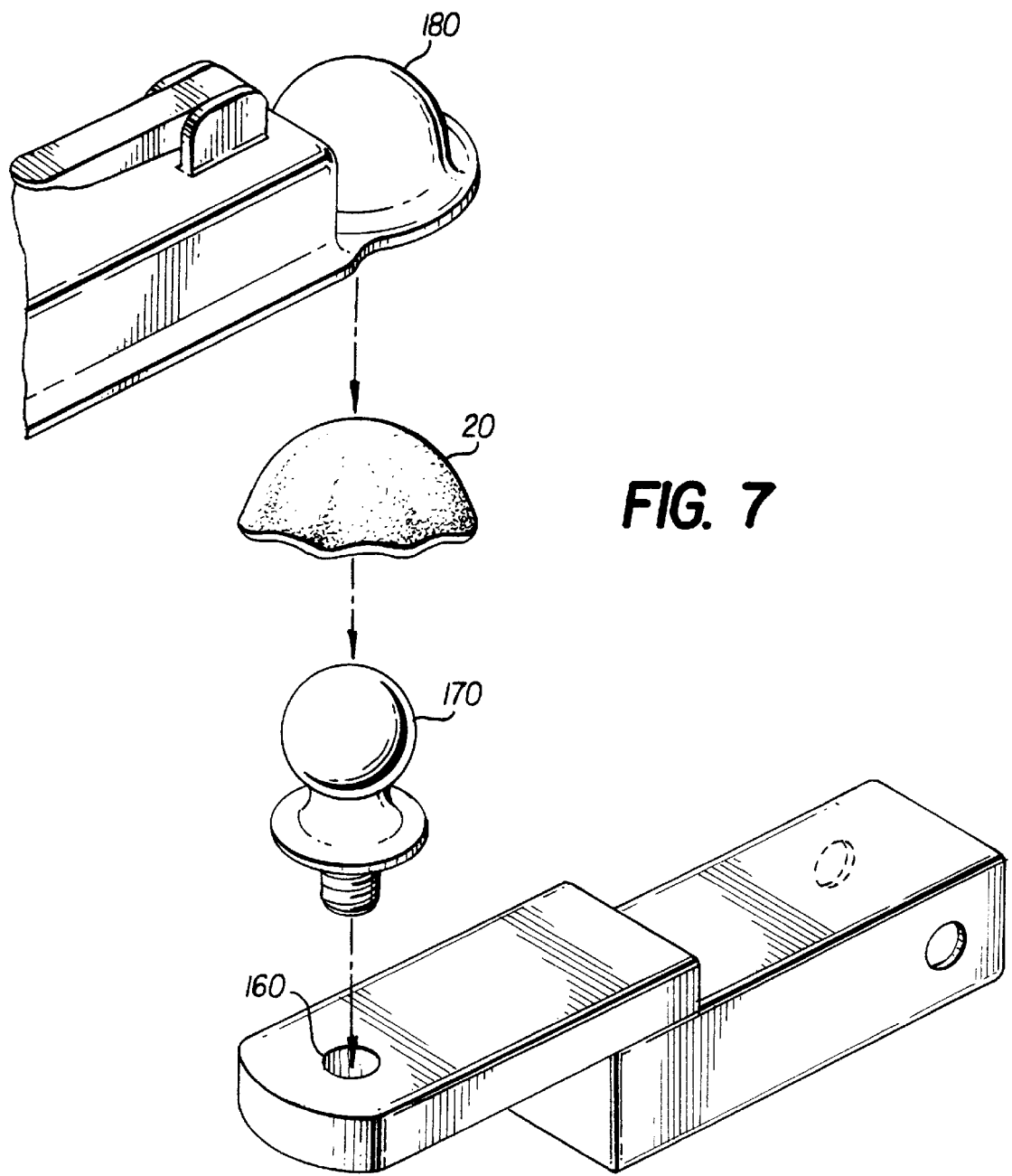
FIG. 7 is an illustration of the installation of the pad between a conventional ball and ball coupler according to the present invention.

Referring to FIG. 6, the flexible pad 20 shown is comprised of two layers of a circularly shaped plastic material bonded together along their respective circumferences so as to form a multilayered pad. Referring to FIG. 7, the flexible pad 20 is inserted between the ball 170 and the ball mount receiver 180 before the ball 170 and the ball receiver 180 are mated for use in towing. The use of multiple layers in the flexible pad acts to provide a grease-free lubricant that reduces friction and wear which occurs with normal use.

The anti-rattle device 10 and 20 of the present invention is inexpensive to manufacture and is readily installed on conventional receiver hitches and their ball mounts without the need for any modification whatsoever of conventional receivers or ball mounts.

It will be obvious to those skilled in the art that modifications can be made to the anti-rattle device of the present invention without departing from the spirit of the invention or the scope of the following claims. The foregoing description and drawings were given for illustrative purposes only, it being understood that the invention is not limited to the embodiments disclosed, but is intended to embrace any and all alternatives, equivalents, modifications or rearrangements of elements failing within the scope of the invention as defined by the following claims.

I claim:

1. A trailer hitch mechanism for use with a vehicle having an anti-rattle device in combination therewith, said hitch mechanism comprising a receiver attachable to the vehicle, said receiver having an open end, and a draw bar slidably insertable into, retainable in and removable from the open end of the receiver, a ball mount rigidly connected to the draw bar, said anti-rattle device comprising:
   at least one flexible shim member adapted for insertion between said draw bar and said receiver; and
   a flexible pad adapted for insertion between a trailer ball mounted on said ball mount and a ball receiver.

2. The trailer hitch mechanism of claim 1 wherein:
   said receiver further comprises a square cross-section having a side dimension, a top, and a bottom; and
   said flexible shim members are rectangular sheets having a width slightly smaller than said side dimension of said receiver, a thickness of at most 0.013 inch and a length that exceeds said width.

3. The trailer hitch mechanism of claim 2 wherein said flexible shim members are inserted between at least one of said top and said bottom of said receiver and said draw bar.

4. The trailer hitch mechanism of claim 2 wherein said flexible shims are plastic.

5. The trailer hitch mechanism of claim 4 wherein said plastic is a high density polycarbonate plastic.

6. The trailer hitch mechanism of claim 1 wherein said flexible pad is a multilayer pad of at least two layers of a circularly shaped plastic material having said circles bonded together along their respective circumferences.

7. The trailer hitch mechanism of claim 6 wherein said circularly shaped plastic is a polyethylene plastic.

8. The trailer hitch mechanism of claim 6 wherein said circularly shaped plastic is a high density polycarbonate plastic.

9. A receiver trailer hitch mechanism for use with a vehicle having an anti-rattle device in combination therewith, said receiver hitch mechanism comprising a receiver attachable to the vehicle, said receiver having an open end, and a draw bar slidably insertable into, retainable in and removable from the open end of the receiver, said anti-rattle device comprising:
   at least one flexible shim member adapted for insertion between said draw bar and said receiver.

10. The receiver trailer hitch mechanism of claim 9 wherein said draw bar is a hitch mountable carrying device mountable to said receiver selected from the group consisting of a bicycle carrier, a ski carrier, an article carrier, and a workbench.

11. A ball mount trailer hitch mechanism for use with a vehicle having an anti-rattle mechanism in combination therewith, said ball mount hitch mechanism comprising a ball mount attachable to the vehicle, said anti-rattle device comprising:
   a flexible multi-layered pad adapted for insertion between a trailer ball mounted on said ball mount and a ball receiver.

12. The ball mount trailer hitch mechanism of claim 11 wherein said flexible pad is a multilayer pad at least two layers of a circularly shaped plastic material having said circles bonded together along their respective circumferences.

13. The ball mount trailer hitch mechanism of claim 12 wherein said circularly shaped plastic is a polyethylene plastic.

14. A kit for eliminating rattle in a trailer hitch mechanism for a vehicle having a receiver attachable to the vehicle, said receiver having an open end, and a draw bar slidably insertable into, retainable in and removable from the open end of the receiver, a trailer ball mount rigidly connected to the draw bar, said kit comprising a. at least one flexible shim member having a uniform thickness adapted for insertion between said draw bar and said receiver; and b. a flexible multi-layered pad adapted for insertion between a trailer ball mounted onto said ball mount and a ball receiver.

15. In a trailer hitch mechanism for use with a vehicle, said hitch mechanism having an anti-rattle device in combination therewith, said hitch mechanism comprising a receiver that is attachable to the vehicle, said receiver having an open end, a draw bar slidably insertable into, retainable in and removable from the open end of the receiver, a ball mount rigidly connected to the draw bar, the anti-rattle device improvement comprising:

at least one flexible shim member inserted between said draw bar and said receiver; and a flexible pad inserted between a trailer ball mounted on said ball mount and a ball receiver.

16. A trailer hitch mechanism for use with a vehicle having an anti-rattle mechanism in combination therewith, said hitch mechanism comprising a ball attachable to the vehicle, said anti-rattle device comprising:

a flexible multi-layered pad adapted for insertion between the ball and a ball receiver.

\* \* \* \* \*